R. A. FESSENDEN.
METHOD AND APPARATUS FOR DETECTING, MEASURING, AND UTILIZING LOW FREQUENCY IMPULSES.
APPLICATION FILED JUNE 6, 1917.

1,429,497.

Patented Sept. 19, 1922.

INVENTOR=
Reginald A. Fessenden

By [signature]
HIS ATTORNEYS=

Patented Sept. 19, 1922.

1,429,497

UNITED STATES PATENT OFFICE.

REGINALD A. FESSENDEN, OF BROOKLINE, MASSACHUSETTS, ASSIGNOR TO SUBMARINE SIGNAL COMPANY, OF PORTLAND, MAINE, A CORPORATION OF MAINE.

METHOD AND APPARATUS FOR DETECTING, MEASURING, AND UTILIZING LOW-FREQUENCY IMPULSES.

Application filed June 6, 1917. Serial No. 173,102.

*To all whom it may concern:*

Be it known that I, REGINALD A. FESSENDEN, of Brookline, in the county of Norfolk and State of Massachusetts, a citizen of the United States, have invented a new and useful Improvement in Methods and Apparatus for Detecting, Measuring, and Utilizing Low-Frequency Impulses, of which the following is a specification.

My invention relates to the detection, measurement and utilization of low frequency impulses, and more especially to low frequency impulses in land, wireless or submarine telegraphy and telephony, and still more especially to the detection of submarines.

It has for its object the increased efficiency of methods and apparatus for these and allied purposes.

Figure 1:
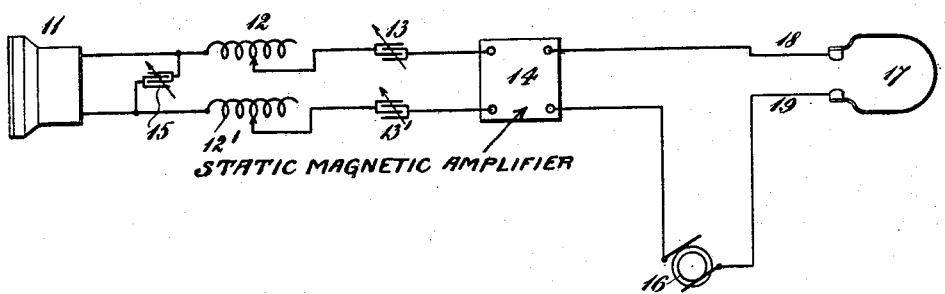
Figure 2:
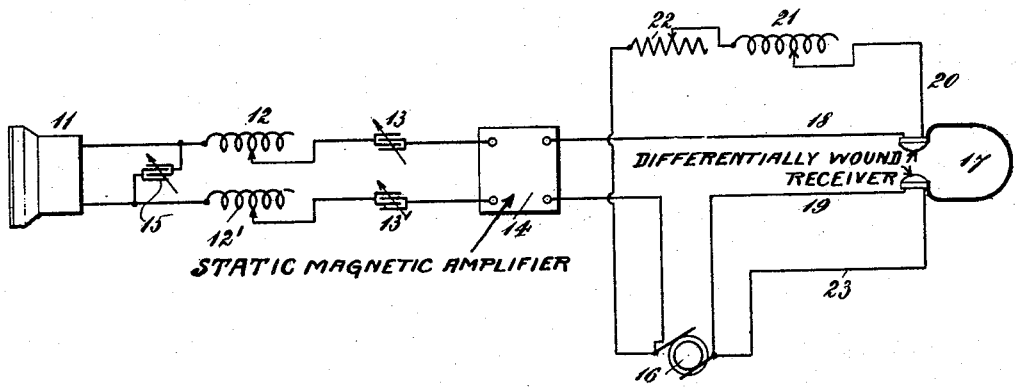

In the accompanying drawings forming a part of this specification, Figures 1 and 2 illustrate diagrammatically two suitable arrangements for carrying out my invention. Other arrangements will occur to those skilled in the art.

In Fig. 1, 11 is a source of low frequency impulses. If a submarine is to be detected 11 may be an oscillator of the type described in United States Patent No. 1,167,366, dated January 4, 1916. 12 and 12' are inductances and 13, 13' and 15 are capacities, both preferably adjustable as shown and arranged in the manner well known in the art so as to constitute a "weeding out" circuit, whereby only impulses of low frequency reach the magnetic amplifier 14. 14 is the well known Fessenden or static magnetic amplifier, which may be of any convenient type, for example, as shown in applicant's U. S. Patents Nos. 706,747 and 1,154,750 or the modified form shown by Alexanderson, General Electric Review, March, 1916. The magnetic amplifier shown in U. S. Patent No. 706,747 is not limited to high frequency, but can work at any frequency, and the amplifier shown in Patent No. 1,154,750 can be used with frequencies of any submultiple. 16 is a source of alternating current having a preferred frequency of approximately 900, that frequency having been discovered by applicant to be that to which the ear is most sensitive. If desired, other frequencies may be used, for example 500 or preferably 2000. 17 is a double receiver shown with headpiece and connected to the circuit 18, 19 and amplifier 14.

On the approach of a submarine low frequency impulses are produced in the sea, as discovered by applicant and disclosed in his United States Patent No. 1,108,895, and these impulses on reaching the oscillator 11 generate low frequency impulses in the circuits 12, 13, 14, 13', 12', 15.

Water noises and other high pitched disturbing noises generated in the oscillator do not all reach 14, being stopped by the weeding out circuit. These low frequency electrical oscillations on reaching the magnetic amplifier 14, are amplified and produce large changes in the current of the circuits 16, 17, 18, 19, for example several hundred times greater than the original low frequency fluctuations in the oscillator 11, and thereby large fluctuations are produced in the intensity of the sound generated in the receiver 17, by which changes in intensity of sound the approach of the submarine may be detected.

If for the oscillator 11 there are substituted the terminals of a submarine cable, the apparatus may be used to detect low frequency telegraphic impulses.

In Fig. 2 is shown an alternative method which differs from Fig. 1 only in that the head phone 17 has instead of the usual winding a differential winding of usual character, constituted of two windings arranged to oppose each other. One winding is connected to the circuit 18, 19, just as in Fig. 1, and the other winding is connected to the circuits 20, 21, 22, 23 (see Fig. 2). In this circuit 21 is an inductance and 22 a resistance, both preferably adjustable, and the inductance and resistance are so adjusted that when no low frequency impulses are being generated by the oscillator 11, the two differential circuits of the telephone receiver 17 just balance each other and no sound is heard in the telephone receiver 17.

On low frequency impulses, however, being generated in the oscillator 11 the strength of the current in the circuit connected to the windings 18 and 19 is greatly increased, and the balance being thus thrown out loud sounds are heard in the telephone receiver 17.

The method and combination of apparatus herein disclosed is based upon the discovery made by applicant that they possess properties entirely different from other methods and combinations of apparatus heretofore used for this purpose and employing amplifiers, and that these properties give greatly increased efficiency in operation.

For example, in detecting and locating submarines one of the greatest difficulties is the presence of high pitched water noises, having a frequency ranging from say 300 to 2000, which water noises tend to drown out the low frequency impulses produced by the submarine.

These high frequency water noises are largely, but not entirely, cut out by the weeding out circuit or by other suitable means well known in the art, but when passed through an amplifier of the pliotron or similar type are restored to practically their original relative strength compared with the submarine noises. This is because amplifiers of these types amplify high frequency disturbances very much more than they amplify low frequency impulses, so that if the weeding out circuit reduces their relative strength from 15 to 2, the pliotron amplifier restores it back again to 15 or even more.

On the other hand, as discovered by the applicant, the magnetic amplifier amplifies approximately in the ratio of the amplifier frequency (i. e., that frequency which is used to operate the amplifier) to the original frequency. Hence, if the frequency generated by the source 16 is 1000 and the low frequency submarine sounds are of frequency 2, the submarine sounds will be amplified 500 times. On the other hand, since the water noises vary in frequency from 300 to 2000 per second, they will either not be amplified at all or at most only three times.

I do not mean to limit my invention to the receipt of low frequency impulses by means of an oscillator as other uses of my invention will occur to those skilled in the art.

Consequently, if to commence with the water noises are 100 times stronger than the submarine sounds, the ratio will be reduced by the weeding out circuit so that they are only 10 times as strong, and when amplified by the magnetic or Fessenden amplifier they will only be one-twentieth as strong. Thus by the method and apparatus herein disclosed, where the water noises were originally 100 times as strong as the submarine noises, after amplification they are only one-twentieth as strong and this enables submarines to be readily detected.

It is to be noted that the weeding out of the high frequency oscillations differs from the method shown by Stratton and others in that in addition to the weeding out of high frequency impulses due to self-induction there is also a further weeding out due to the peculiar property of the static magnetic amplifier, referred to above, of amplifying low frequency impulses of a given energy many times more than high frequency impulses of equal energy.

What I claim is:—

1. The method of detecting and utilizing low frequency comparatively inaudible impulses in the presence of disturbing high frequency impulses which consists in passing said low frequency impulses together with said undesired high frequency impulses through an amplifier whose amplification constant is the function of the ratio of the frequency in the amplified circuit to the frequency of the current to be amplified, and employing as the frequency of the amplified circuit a frequency of the order of one thousand per second, whereby said low frequency comparatively inaudible impulses are highly magnified and rendered highly audible, while said undesired high frequency impulses are substantially weeded out.

2. Apparatus for the detecting and utilization of low frequency impulses and for the elimination of undesired high frequency impulses, comprising a member adapted to receive both low and high frequency impulses, a weeding out circuit connected thereto and adapted to weed out the high frequency impulses, a static magnetic amplifier, and an electro-magnetic indicating mechanism connected to the amplified side of the magnetic amplifier.

REGINALD A. FESSENDEN.